United States Patent
Tasaki et al.

(10) Patent No.: US 9,647,297 B2
(45) Date of Patent: May 9, 2017

(54) PRODUCTION METHOD FOR NON-AQUEOUS ELECTROLYTE SECONDARY BATTERY

(71) Applicants: Automotive Energy Supply Corporation, Zama-shi, Kanagawa (JP); NISSAN MOTOR CO., LTD., Yokohama-shi, Kanagawa (JP)

(72) Inventors: Shinichi Tasaki, Yokohama (JP); Chika Amemiya, Yokohama (JP); Daisuke Iga, Chofu (JP); Takeshi Yasooka, Yamato (JP)

(73) Assignees: AUTOMOTIVE ENERGY SUPPLY CORPORATION, Zama-shi (JP); NISSAN MOTOR CO., LTD., Yokohama-shi (JP)

( * ) Notice: Subject to any disclaimer, the term of this patent is extended or adjusted under 35 U.S.C. 154(b) by 302 days.

(21) Appl. No.: 14/372,892

(22) PCT Filed: Jan. 10, 2013

(86) PCT No.: PCT/JP2013/050315
§ 371 (c)(1),
(2) Date: Jul. 17, 2014

(87) PCT Pub. No.: WO2013/108708
PCT Pub. Date: Jul. 25, 2013

(65) Prior Publication Data
US 2014/0352140 A1 Dec. 4, 2014

(30) Foreign Application Priority Data
Jan. 20, 2012 (JP) .................................. 2012-009911

(51) Int. Cl.
*H01M 2/00* (2006.01)
*H01M 10/058* (2010.01)
(Continued)

(52) U.S. Cl.
CPC ......... *H01M 10/058* (2013.01); *H01M 10/05* (2013.01); *H01M 10/052* (2013.01);
(Continued)

(58) Field of Classification Search
CPC ...................................................... H01M 2/00
See application file for complete search history.

(56) References Cited

U.S. PATENT DOCUMENTS

| | | | |
|---|---|---|---|
| 6,468,690 B1 * | 10/2002 | Barker | H01M 10/0525 205/59 |
| 6,908,704 B2 | 6/2005 | Lee | |
| 2011/0200855 A1 * | 8/2011 | Watanabe | H01L 31/02021 429/80 |

FOREIGN PATENT DOCUMENTS

| | | |
|---|---|---|
| CN | 1423360 A | 6/2003 |
| EP | 1 930 977 A1 | 6/2008 |

(Continued)

OTHER PUBLICATIONS

Machine Translation of JP 2008-262895 A, 14 pages.
(Continued)

*Primary Examiner* — Jacob Marks
(74) *Attorney, Agent, or Firm* — Foley & Lardner LLP

(57) ABSTRACT

According to the present invention, there is provided a seal step (ST105) storing an electrode laminate in which a separator is disposed between a positive electrode and a negative electrode and an electrolyte within an exterior body constituted by a laminate film and sealing the exterior body; a pressure application step (ST106) of applying a pressure to the exterior body in which the electrode laminate is stored by means of a flat plate press working or so forth; charge step (ST102) of charging up to a full charge; a gas removal step (ST107) of unsealing the exterior body and removing gas generated within the exterior body at the charge step; and a re-seal step (ST108) of sealing the exterior body after the gas removal step.

(Continued)

The number of times of the gas removal steps is small and an influence of gas on battery characteristics is suppressed.

12 Claims, 5 Drawing Sheets

(51) Int. Cl.
  *H01M 10/44* (2006.01)
  *H01M 10/52* (2006.01)
  *H01M 10/052* (2010.01)
  *H01M 10/05* (2010.01)
  *H01M 10/04* (2006.01)
  *H01M 10/0525* (2010.01)
  *H01M 10/0585* (2010.01)
  *H01M 2/02* (2006.01)

(52) U.S. Cl.
  CPC ......... *H01M 10/446* (2013.01); *H01M 10/52* (2013.01); *H01M 2/0275* (2013.01); *H01M 2/0277* (2013.01); *H01M 2/0287* (2013.01); *H01M 10/0472* (2013.01); *H01M 10/0525* (2013.01); *H01M 10/0585* (2013.01); *Y02P 70/54* (2015.11); *Y10T 29/4911* (2015.01)

(56) References Cited

FOREIGN PATENT DOCUMENTS

| | | |
|---|---|---|
| JP | 10-308240 A | 11/1998 |
| JP | 200193580 A | 4/2001 |
| JP | 2003-331916 A | 11/2003 |
| JP | 2008-130450 A | 6/2008 |
| JP | 2008-262895 A | 10/2008 |
| JP | 2009-187711 A | 8/2009 |
| JP | 2010-9983 A | 1/2010 |

OTHER PUBLICATIONS

Machine Translation of JP 2001-093580, 11 pages.
Machine Translation of JP 2009-187711, 6 pages.
Machine Translation of JP 2010-009983, 20 pages.
European Extended Search Report, Sep. 7, 2015, 6 pages.
Japanese Office Action, Aug. 4, 2015, 4 pages.

* cited by examiner

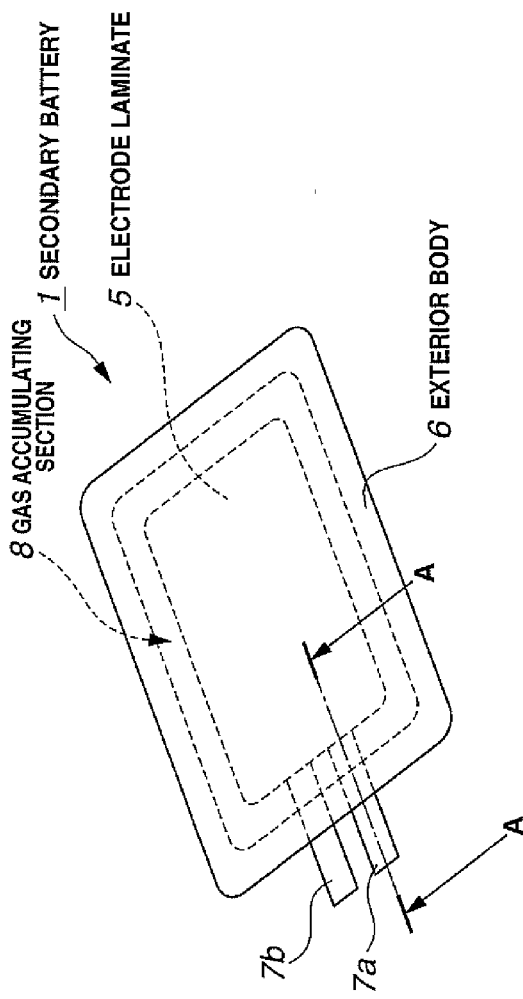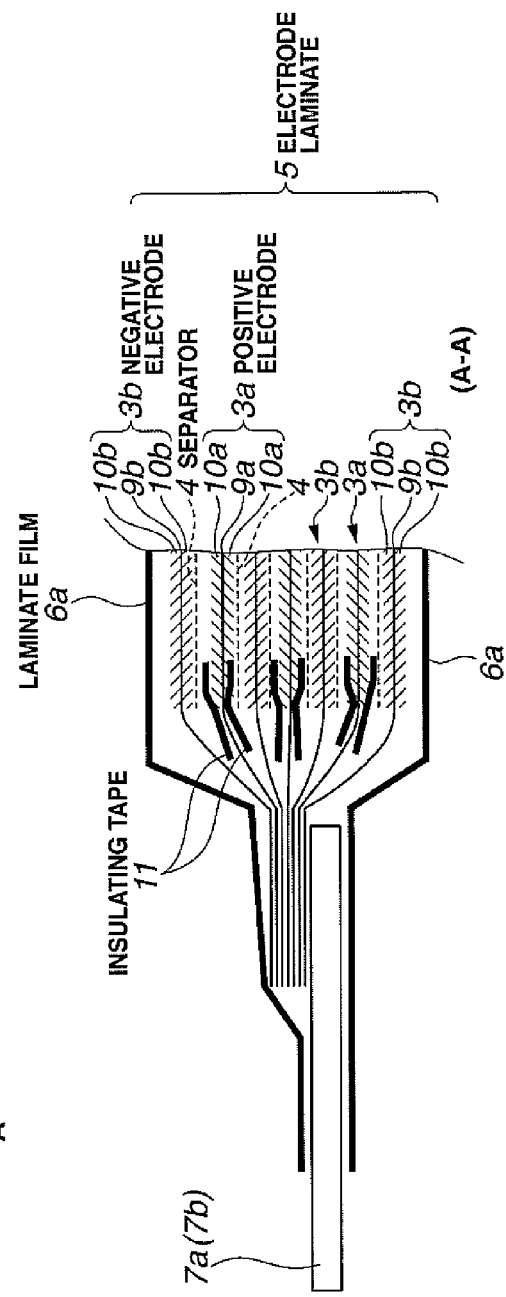

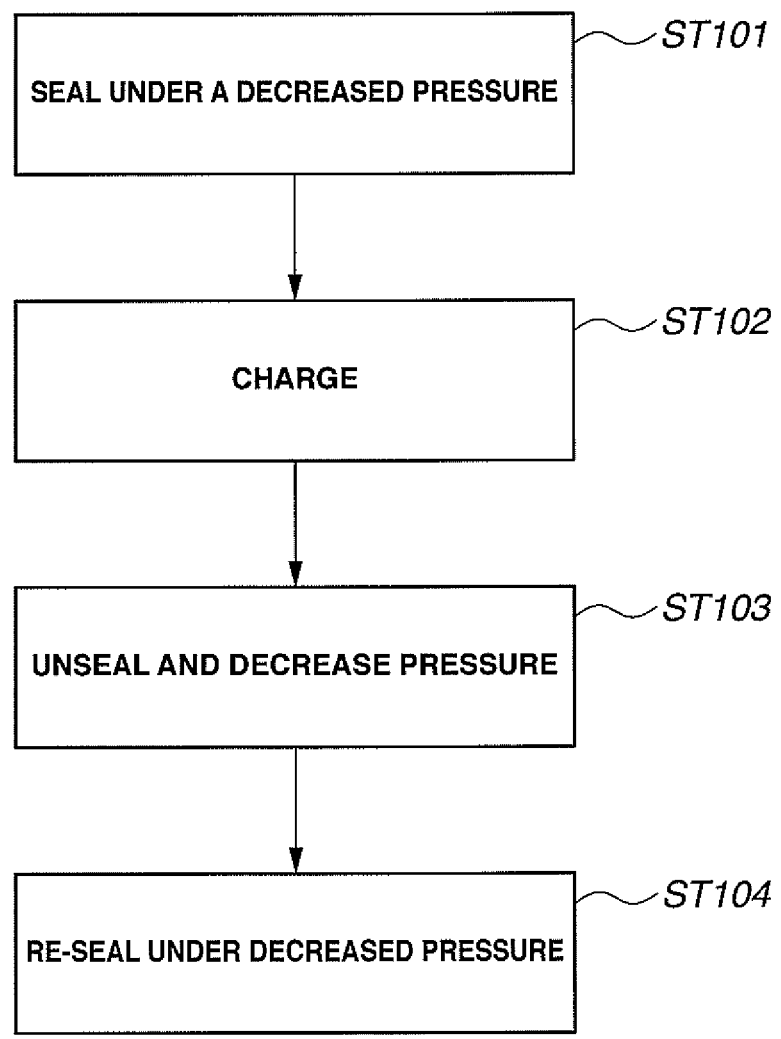

PRODUCTION METHOD FOR NON-AQUEOUS ELECTROLYTE SECONDARY BATTERY

TECHNICAL FIELD

The present invention relates to a manufacturing method of a non-aqueous electrolyte secondary battery storing an electrode laminate in which a separator is disposed between a positive electrode and a negative electrode and an electrolyte within an exterior body constituted by an exterior body and sealing the exterior body and having a charge step carrying out an electric charge via a terminal of the electrode laminate.

BACKGROUND ART

For example, a lithium ion secondary battery is known as a non-aqueous electrolyte secondary battery. The lithium ion secondary battery has high energy density, high operating voltage, small self-discharge, and superior features as compared with a conventional secondary battery such as a nickel-metal hydride battery or a lead storage battery. The lithium ion secondary battery is widely utilized for a small sized electronic equipment such as a laptop computer or a cellular phone and, furthermore, recently as a storage power supply of on-board and stationary type.

In manufacturing processes of the lithium ion secondary battery, after a sealing step of storing and sealing the electrode laminate in which separators are disposed between a plurality of electrodes and the electrolyte within the exterior body constituted by the laminate film, a charge step of charging up to a full charge is carried out.

In the sealing step or charge step, gas is generated in association with a reaction of the electrolyte. In order to prevent a reduction in the battery characteristics due to gas resided within the exterior body, a gas removal step of removing gas within the exterior body is carried out after the charge step. In such a gas removal step as described above, an operation of unsealing the exterior body is carried out.

A Patent Document 1 discloses the manufacturing method of the battery having a sealing step of sealing the electrode laminate and a particular filing material into the exterior body, a first charge step of charging up to less than a full charge voltage, and a second charge step of charging to the full charge. According to this manufacturing method, the gas removal step is carried out using a particular filling material after the first charge step so that unsealing the exterior body in order to remove gas after the second charge step is not needed.

However, in the manufacturing method described in the above-described Patent Document 1, although the gas removal step can be eliminated which is carried out after the second charge step, gas generated after the second charge step reduces the battery characteristics.

Hence, it is preferable to suppress an influence of gas on the battery characteristics, in the manufacturing method of the battery. In addition, in a case where the reduction of the battery characteristic due to a contact of the electrode or electrolyte on moisture in the air or oxygen and a safety of the manufacturing step are taken into consideration, it is desirable to reduce number of times of the gas removal steps which unseal the exterior body.

It is, therefore, an object of the present invention to provide a manufacturing method of a non-aqueous electrolyte secondary battery which can solve the above-described task.

PRE-PUBLISHED DOCUMENT

Patent Document 1: Japanese Patent Application First Publication (tokkai) No. 2008-262895

DISCLOSURE OF THE INVENTION

According to one aspect of the present invention, there is provided a manufacturing method of a non-aqueous electrolyte secondary battery, comprising: a seal step of storing an electrode laminate in which a separator is disposed between a positive electrode and a negative electrode and an electrolyte within an exterior body constituted by a laminate film and sealing the exterior body; a pressure application step of applying a pressure on the exterior body in which the electrode laminate is stored; a charge step of charging up to a full charge; a gas removal step of removing gas generated within the exterior body at the charge step with the exterior body unsealed; and a re-seal step of sealing the exterior body after the gas removal step.

According to another aspect of the present invention, there is provided a manufacturing method of an non-aqueous electrolyte secondary battery, comprising: a seal step of storing an electrode laminate in which a separator is disposed between a positive electrode and a negative electrode within an exterior body constituted by a laminate film and sealing the exterior body under a decreased pressure; a charge step of charging up to a full charge after the seal step; a gas removal step of removing gas generated within the exterior body at the charge step under a decreased pressure with the exterior body unsealed; and a re-seal step of sealing the exterior body after the gas removal step.

According to the present invention, the number of times of the gas removal steps are reduced and the influence of gas on battery characteristics can be suppressed.

BRIEF DESCRIPTION OF THE DRAWINGS

FIGS. 1(a) and 1(b) are cross sectional views representing a secondary battery manufactured in a manufacturing method for a secondary battery in a first preferred embodiment.

FIG. 2 is a process flowchart for explaining the manufacturing method of the secondary battery in the first preferred embodiment.

EMBODIMENTS FOR CARRYING OUT THE INVENTION

Figure 3:
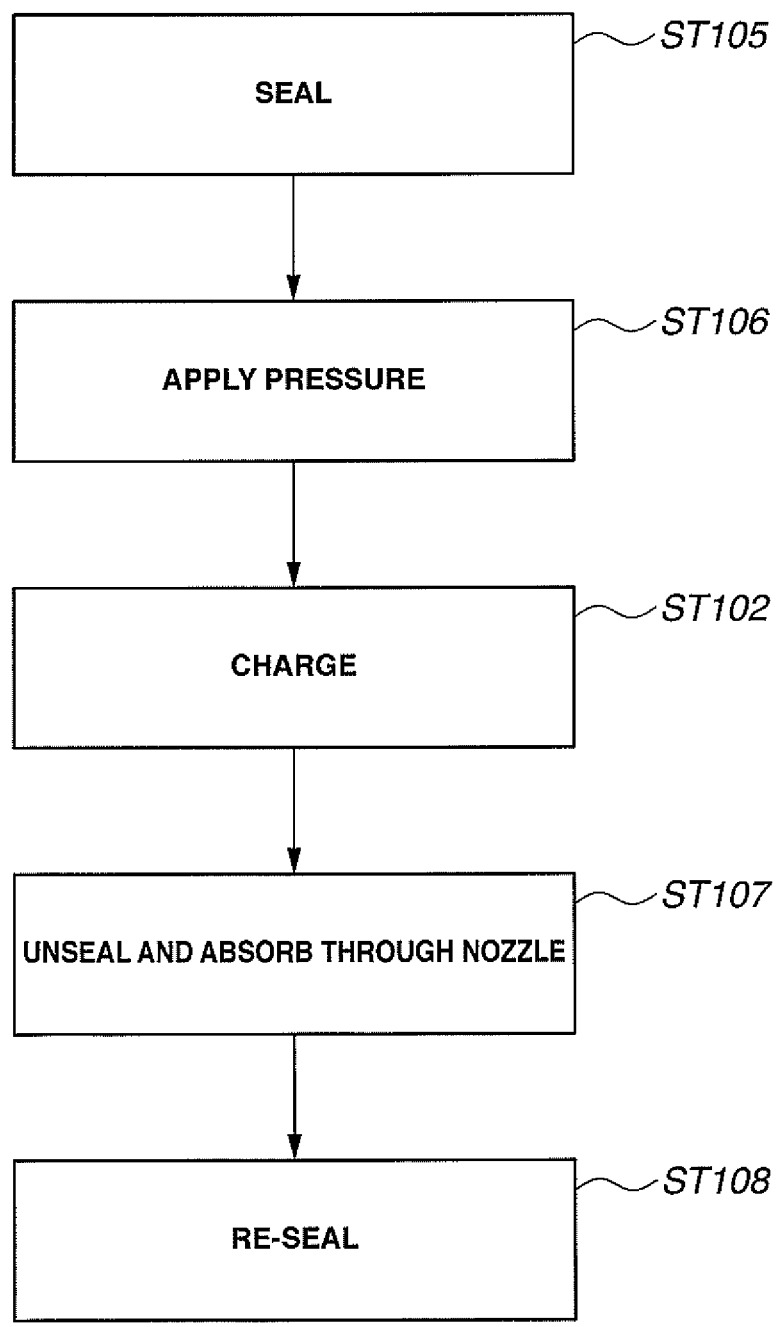
FIG. 3 is a process flowchart for explaining the manufacturing method of the secondary battery in a second preferred embodiment.

Hereinafter, specific embodiments according to the present invention will be explained with reference to the drawings.

First Embodiment

FIGS. 1(a) and 1(b) show a cross sectional view of a non-aqueous electrolyte secondary battery manufactured by the manufacturing method for a secondary battery in a first preferred embodiment. FIG. 2 shows a process flowchart for explaining the manufacturing method for the secondary battery in the first preferred embodiment. FIG. 1(a) shows a perspective view of the non-aqueous electrolyte secondary battery and FIG. 1(b) shows a cross sectional view cut away along a line A-A of FIG. 1(a).

As shown in FIG. 1(a), a non-aqueous electrolyte secondary battery 1 manufactured by the manufacturing method in the first embodiment is a large capacity lithium ion secondary battery suitable for driving, for example, a vehicle in which the non-aqueous electrolyte secondary battery is mounted. A size of an electrode is, for example, 210 mm×297 mm or 148 mm×210 mm and a capacity of the battery is 4 Ah or higher.

Non-aqueous electrolyte secondary battery 1 manufactured in the first embodiment, as shown in FIG. 1(b), includes: an electrode laminate 5 in which separators 4 are disposed between positive electrodes 3a and negative electrodes 3b; an electrolyte (electrolytic solution); an exterior body 6 constituted by a laminate film 6a which seals these. Exterior body 6 may be formed by folding one sheet of laminate film 6a and by thermally sealing three peripheral sides or may be formed by overlapping two sheets of laminate films and by thermally sealing four of the peripheral sides. A thickness of laminate film 6a is preferably about 100 μm~200 μm and a flexible film.

Each of electrodes 3 of negative electrodes 3b and positive electrodes 3a and separators 4 is formed in a rectangular shape. Negative electrodes 3b and positive electrodes 3a are alternately laminated via separators 4. Negative electrodes 3b are respectively disposed on both ends of electrode laminate 5 in a laminating direction.

Positive electrode 3a is an application of a cathode active material 10a onto a current collecting aluminum foil 9a and, as cathode active material 10a, a composite oxide such as $LiCoO_2$, $LiMnO_2$, or so forth is used. Negative electrode 3b is an application of an anode active material 10b onto a current collecting copper foil 9b and, as anode active material 9b, a graphite, amorphous carbon, or so forth is used. An insulating tape 11 to prevent a short circuit between negative electrodes 3b and positive electrodes 3a is pasted onto a boundary between cathode active material 10a and current collecting aluminum foil 9a.

A negative electrode terminal 7b is connected to a tip section of a part extended from a current collecting copper foil 9b of negative electrode 3b of electrode laminate 5. One end section of negative electrode terminal 7b is connected to a part extended from current collecting copper foil 9b and the other end section of negative electrode terminal 7b is projected toward an outside of exterior body 6. A positive electrode terminal 7a has the same structure as negative electrode terminal 7b. Both of negative electrode terminal 7b and positive electrode terminal 7a may respectively be projected from one side of rectangular shaped exterior body 6. Or alternatively, both electrode terminals may respectively be projected from both mutually opposing sides of exterior body 6 of rectangular exterior body 6.

The laminate film forming exterior body 6 is formed and laminated in an order of a heat fusion layer (inner layer), a metallic layer, and a protective layer (outer layer) (not shown). The inner layer is formed of a polyolefin series resin. The metallic layer is formed of an aluminum foil. The outer layer is formed of a PET (polyethylene-telephthalate).

In addition, as shown in FIG. 1(a), a rectangular frame shaped space is formed over an outer peripheral edge section of electrode laminate 5 within exterior body 6 and functions as a gas accumulating section 8 to accumulate gas generated during a use of the secondary battery. In addition, in the manufacturing method of the secondary battery, the gas accumulating section can be utilized as a space to accumulate gas extruded from electrodes 3 of electrode laminate 5 at a pressure application step which will be described later.

As shown in FIG. 2, the manufacturing method of the secondary battery in the first embodiment includes: a sealing (a seal) step of storing electrode laminate 5 in which separators 4 are disposed between positive electrode 3a and negative electrode 3b and an electrolyte within exterior body 6 constituted by the laminate film and sealing the exterior body under a decreased pressure; a charging (a charge) step of charging up to a full charge after the sealing step; a gas removal step of removing gas under the decreased pressure with exterior body 6 opened (unsealed); and a re-sealing (re-seal) step of sealing exterior body 6 under the decreased pressure after the gas removal step.

In the seal step shown in a step ST101 in FIG. 2, electrode laminate 5 is stored within exterior body 6, the electrolyte is injected into exterior body 6, and the opening of exterior body 6 is sealed under the decreased pressure. $LiPF_6$ (lithium hexafluorophosphate), $LiBF_4$ (Lithium borofluoride), $LiClO_4$ (Lithium perchlorate) or so forth can be used as the electrolyte. One kind or plural kinds of solvents can be selected from PC (propylene carbonate), EC (ethylene carbonate), DEC (diethyl carbonate), and so forth. In the seal step, when exterior body 6 is sealed, gas accumulating section 8 that exterior body 6 has is deflated. A degree of decreased pressure (a degree of vacuum) at the seal step is preferably about 1 hPa through 100 hPa.

In the charge step shown in a step ST102, charging up to a capacity of 100% (full charge) is carried out.

In the gas removal step shown in step ST103, part of exterior body 6 is unsealed and gas generated within exterior body 6 is externally exhausted under the decreased pressure. In the gas removal step, the pressure decreased state may be carried out after the unsealing of exterior body 6 or exterior body 6 may be unsealed under the pressure decreased state. In the re-seal step shown in step ST104, exterior body 6 unsealed at the gas removal step is sealed under pressure decreased state. The degree of decreased pressure at the gas removal step and at the re-seal step is preferably about 1 hPa through 100 hPa.

In the re-sealing (re-seal) step, the pressure decrease is carried out so that exterior body 6 is again deflated.

Thus, gas accumulating section 8 can be utilized as a space for housing gas generated during the use of the secondary battery. Since exterior body 6 is formed of the flexible laminate film, gas accumulating section 8 functions as the space for accumulating gas during the manufacture of the secondary battery and during the use of the secondary battery.

It should be noted that, in a case where the exterior body is structured to have a rigidity such as a hard casing, it becomes difficult to store a plurality of cells within a module when the exterior body is deformed due to gas accumulated during the manufacture of the secondary battery. Hence, the exterior body may preferably be formed of the flexible laminate film.

As described above, according to the manufacturing method of the secondary battery in the first embodiment, the seal step is carried out under the decreased pressure. Thus, gas generated when electrode laminate 5 and the electrolyte are stored in exterior body 6 at the seal step can smoothly be removed. Therefore, the influence of gas at the charge step can be reduced without carrying out the gas removal step with exterior body 6 unsealed before the charge step.

In addition, in the first embodiment, gas is removed under the decreased pressure after the charge step. Gas generated within exterior body 6 at the charge step can smoothly be removed to the outside of exterior body 6. Consequently, the number of times of the gas removal steps can be reduced and the influence of gas on the battery characteristics can be suppressed.

Hereinafter, the manufacturing method of the secondary battery in other preferred embodiments and modification of each of the other preferred embodiments will be described.

Second Embodiment

FIG. 3 shows a process flowchart for explaining the manufacturing method for the secondary battery in a second preferred embodiment according to the present invention.
In the second embodiment, a pressure application step of applying a pressure to exterior body 6 sealed at the seal step is interposed between the seal step and the charge step.
In the second embodiment, the same steps as the manufacturing method in the first embodiment designate the same signs as the first embodiment and their explanations will be omitted. In addition, in the second embodiment, the same elements as the non-aqueous electrolyte secondary battery in the first embodiment designate the same signs and their explanations will be omitted.

As shown in FIG. 3, the manufacturing method of the secondary battery in the second embodiment includes: storing electrode laminate 5 in which separators 4 are disposed between positive electrodes 3a and negative electrodes 3b and the electrolyte within exterior body 6 constituted by the laminate film and sealing exterior body 6; a pressure application step of applying a pressure on exterior body 6 in which the electrode laminate 5 is stored; a charge step of charging up to the full charge; a gas removal step of removing gas generated within exterior body 6 at the charge step by unsealing exterior body 6 inserting a nozzle into an unsealed port of the exterior body and by absorbing gas within the inside of exterior body 6; and a re-seal step of re-sealing exterior body 6 after the gas removal step.

In the seal step shown in step ST105 in FIG. 3, electrode laminate 5 is stored within exterior body 6, the electrolyte is injected within exterior body 6, and an opening of exterior body 6 is sealed. Those used in the first embodiment can be utilized for the electrolyte and the solvent.

In the pressure application step in the second embodiment shown in a step ST106 in FIG. 3, a flat plate press working is carried out in a state in which exterior body 6 is sealed. Thus, gas within electrode laminate 5 is moved to an outside of electrode laminate 5 but within exterior body 6. A surface of the flat plate press is made of a material having an insulating characteristic and may, preferably, be made of a resin material. After the seal step, gas accumulating section 8 of exterior body 6 is deflated. However, gas is moved so that the flexible laminate film becomes inflated and gas can be accumulated within gas accumulating section 8. The flat plate press working may, preferably, be carried out under a pressure about 1 kgf/cm$^2$ through 100 kgf/cm$^2$.

In the charge step shown in a step ST102, the charge is carried out up to 100% (full charge) of capacity. In the gas removal step shown in a step ST107, a part of exterior body is unsealed, a nozzle is inserted through an unsealed port, and gas of an inside of exterior body 6 is absorbed and removed via the nozzle. In the re-seal step shown in a step ST108, the unsealed exterior body 6 is sealed.

It should be noted that the seal step (step ST105), the gas removal step (step ST107), and the re-seal step (step ST108) in the second embodiment may be carried out under the decreased pressure as will be described later in a modification example 2B.

According to the manufacturing method for the secondary battery in the second embodiment, the pressure application step is provided so that gas generated within exterior body 6 after the seal step can be moved within gas ic accumulating section 8 from an inside of electrode laminate 5. Thus, the influence of gas at the charge step can be reduced without carrying out the gas removal step with exterior body 6 unsealed before the charge step.

In addition, in the second embodiment, the gas removal step is carried out after the charge step. Thus, an introduction of a reduction of the battery characteristics due to gas generated within exterior body 6 at the charge step can be suppressed.

Consequently, the number of times of the gas removal steps can be reduced and the influence of gas on the battery characteristics can be suppressed.

Modification Example 2A of the Second Embodiment

In the pressure application step in the second embodiment, a roll press working using a roll is carried out in place of the flat plate.

In this pressure application step, the roll press working using the roll is carried out in a state in which exterior body 6 is sealed so that gas within electrode laminate 5 is moved to the outside of electrode laminate 5. After the seal step, gas accumulating section 8 of exterior body 6 is deflated. However, the movement of gas causes the flexible laminate film is inflated and gas can be accumulated within gas accumulating section 8. The roll press working may preferably be carried out under the pressure about 1 kgf/cm$^2$ through 100 kgf/cm$^2$ and a movement of a roll press may, preferably, be moved from the outside of exterior body 6 along a surface of electrodes 3 of electrode laminate 5.

A surface of the roll press is made of a material having an insulating characteristic and may preferably be made of a resin material.

In either of types in which both of negative electrode terminal 7b and positive electrode terminal 7a are projected from one side of exterior body 6 and in which negative electrode terminal 7b and positive electrode terminal 7a are respectively projected from opposing respective sides of exterior body 6, insulating tape 11 pasted onto a boundary part of each cathode active material and a cathode (positive electrode) current collecting copper foil is provided. In this case, it is preferable to move a roller from one end section (a side at which positive electrode terminal 7a is disposed) on which insulating tape 11 is pasted toward a direction of the other end section which is opposite to the one end section.

In place of pasting insulating tape 11 on the positive electrode 3a side, insulating tape 11 may be pasted on negative electrode 3b side. In this case, the roller may be rolled and moved from one end section at negative electrode terminal 7b side on which insulating tape 11 is pasted toward the other end section opposite to the one end section. Thus, gas accumulated in a proximity of insulating tape 11 can effectively be moved.

Gas generated within exterior body 6 after the seal step can smoothly be moved toward an inside of gas accumulating section 8 from electrode laminate 5 by providing the pressure application step during which the roll press working is carried out. Thus, without carrying out the gas removal step with exterior body unsealed before the charge step, the influence of gas at the charge step can be reduced.

In addition, in the second embodiment, the gas removal step is carried out after the charge step. Thus, an introduction of the reduction of the battery characteristics due to the gas generated within exterior body 6 at the charge step can be suppressed. Consequently, the number of times of the gas removal steps are reduced and the influence of gas on the battery characteristics can be suppressed.

Modification Example 2B of the Second Embodiment

The gas removal step in the second embodiment is not carried out through the absorbing method through the nozzle but is carried out under the decreased pressure and the re-seal step is carried out under the decreased pressure. Thus, gas generated at the charge step and gas moved at the pressure application step and accumulated at gas accumulating section 8 can smoothly be removed to the outside of exterior body 6.

In addition, the seal step in the second embodiment is carried out under the decreased pressure. Thus, gas generated when electrode laminate 5 and the electrolyte are stored within exterior body 6 can smoothly be removed to the outside of exterior body 6. It should be noted that modification example 2A and modification example 2B may be combined and applied to the present invention.

Third Embodiment

Figure 4:
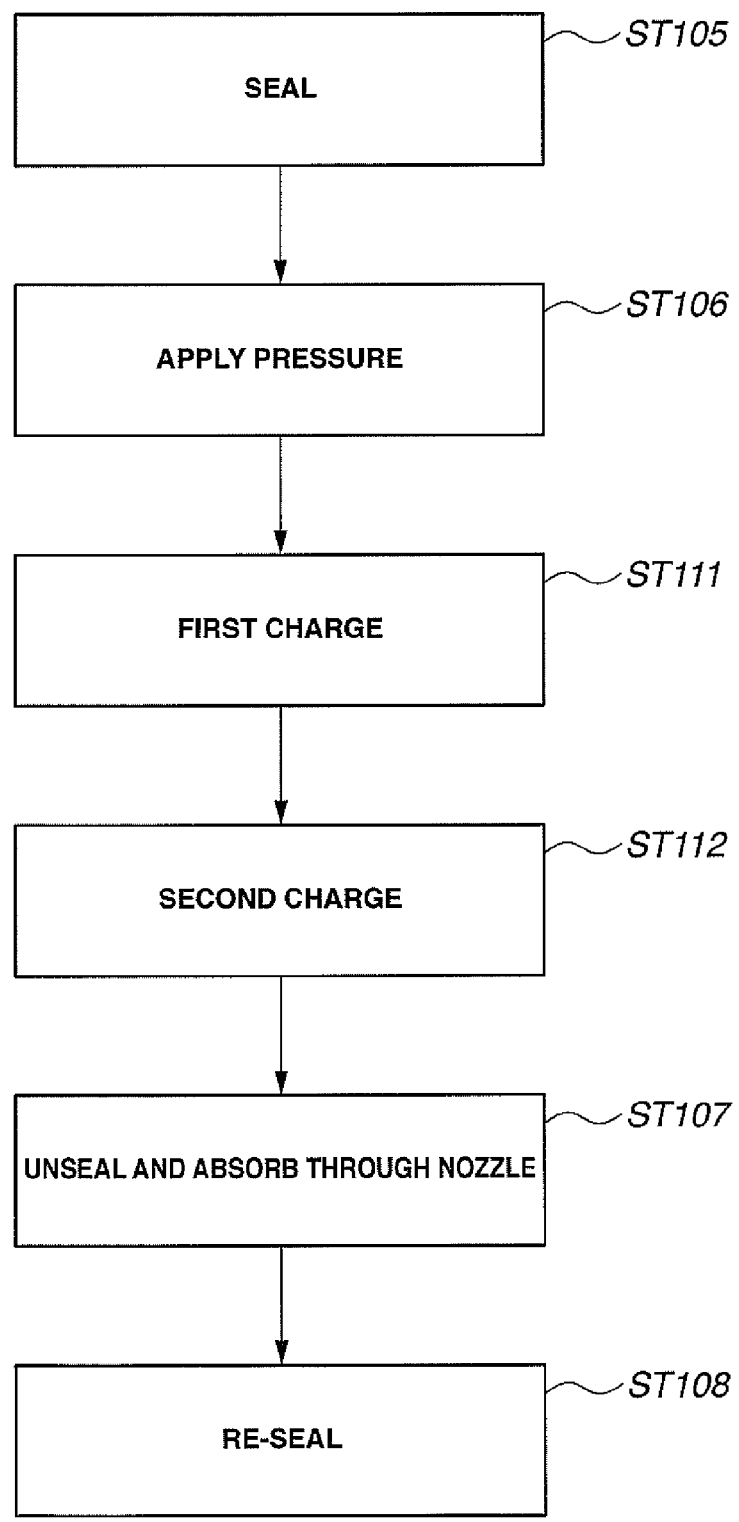
FIG. 4 is a process flowchart for explaining the manufacturing method of the secondary battery in a third preferred embodiment.

FIG. 4 shows a process flowchart for explaining the method of manufacturing the secondary battery in a third preferred embodiment.

In the third embodiment, the same steps as the manufacturing the secondary battery in the first embodiment designate the corresponding steps in the third embodiment and their detailed explanations will herein be omitted. In addition, the same elements as the non-aqueous electrolyte secondary battery in the first embodiment designate the corresponding elements in the third embodiments.

As shown in FIG. 4, the manufacturing method for the secondary battery in the third embodiment includes: the seal step of storing electrode laminate 5 in which separators 4 are disposed between positive electrodes 3a and negative electrodes 3b and the electrolyte within exterior body 6 constituted by the laminate film and sealing exterior body 6, the pressure application step of applying the pressure to exterior body 6 in which electrode laminate 5 is stored; a first charge step of charging up to a voltage lower than a voltage of the full charge after the pressure application step; a second charge step of charging up to the full charge without unsealing of exterior body 6 after the first charge step; gas removal step of unsealing exterior body 6, inserting the nozzle into the unsealed port of exterior body 6, and absorbing gas to remove gas which is generated within exterior body 6 at the second charge step; and a re-seal step of sealing exterior body 6 after the gas removal step.

At the seal step shown in a step ST105 in FIG. 4, electrode laminate 5 is stored in exterior body 6, the electrolyte is injected in exterior body 6, and the opening (or unsealed port) of exterior body 6 is sealed. Those used in the first embodiment can be utilized for the electrolyte and the solvent.

In the pressure application step shown in a step ST106 in FIG. 4, the flat plate press working using the flat plate is carried out with exterior body 6 sealed in the same way as the second embodiment. Thus, gas generated within exterior body 6 is moved from the inside of electrode laminate 5 to an inside of gas accumulating section 8.

In the first charge step shown in a step ST111, the charge is carried out up to a voltage lower than the voltage of the full charge, for example, up to about 5% through 50% of the capacity. In the second charge step shown in step ST112, the charge is carried out up to 100% of the capacity (full charge).

In the gas removal step shown in step ST107, a part of exterior body 6 is unsealed, the nozzle is inserted into the unsealed port, gas within the inside of exterior body 6 is absorbed and gas is removed.

In the re-seal step shown in a step ST108, the unsealed exterior body 6 is sealed.

According to the manufacturing method of the secondary battery in the third embodiment, the gas removal step is carried out after the second charge step.

Thus, an introduction of a reduction of the battery characteristics due to gas generated within exterior body 6 at the charge step can be suppressed. Consequently, the number of times of the gas removal steps can be reduced and the influence of gas on the battery characteristics can be suppressed.

Modification Example 3A of the Third Embodiment

In the pressure application step in the third embodiment (step ST106 in FIG. 4), the roll press working using the roll is carried out in the same way as modification example 2A of the second embodiment in place of the use of the flat plate so that gas generated within exterior body 6 can smoothly be moved from the inside of electrode laminate 5 to the inside of gas accumulating section 8.

Modification Example 3B of the Third Embodiment

In the same way as modification example 2B of the second embodiment, the gas removal step in the third embodiment is carried out under the decreased pressure so that gas generated at the charge step can smoothly be removed to the outside of exterior body 6. In addition, the seal step in the third embodiment is carried out under the decreased pressure. Thus, gas generated when electrode laminate 5 and electrolyte are stored within the exterior body 6 can smoothly be removed to the outside of exterior body 6.

Fourth Embodiment

Figure 5:
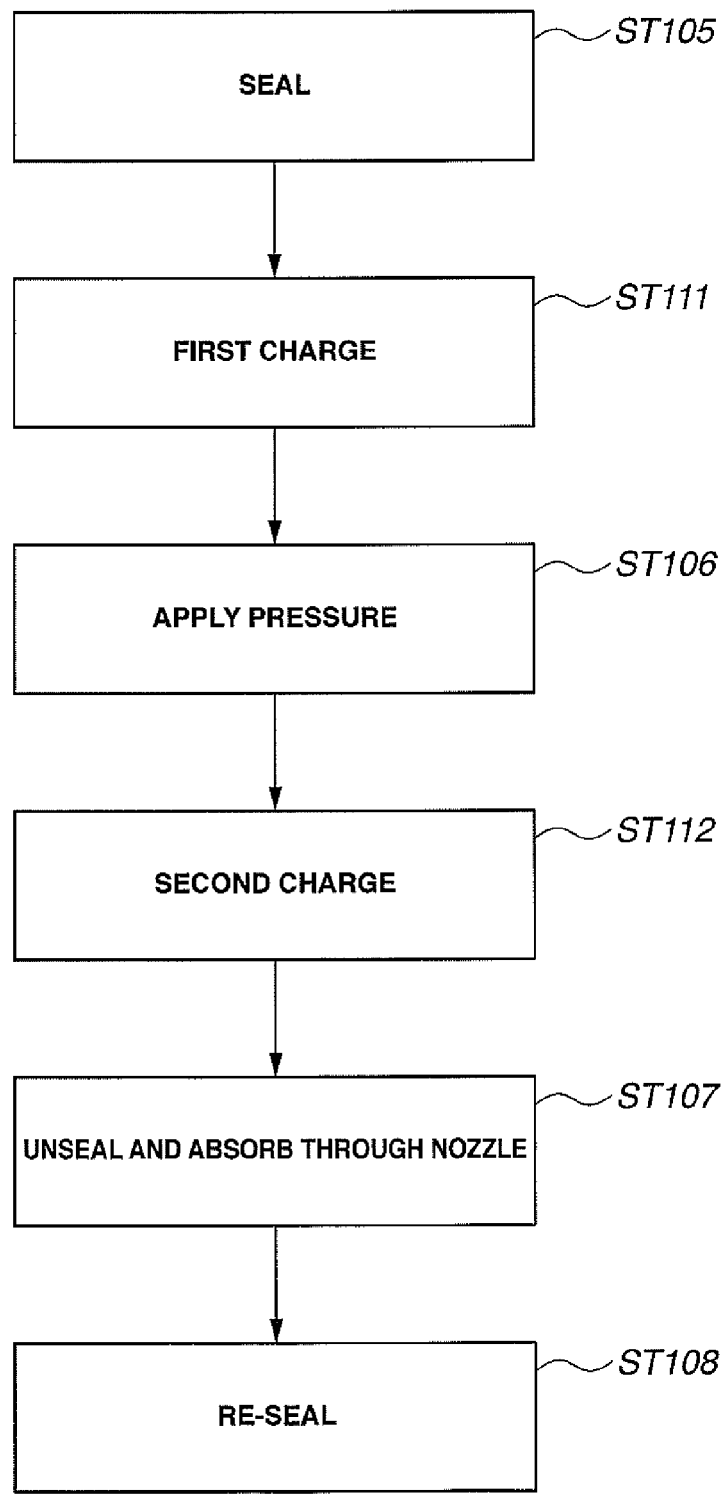
FIG. 5 is a process flowchart for explaining the manufacturing method of the secondary battery in a fourth preferred embodiment.

FIG. 5 shows a process flowchart for explaining the manufacturing method of the secondary battery in a fourth preferred embodiment.

In the fourth embodiment, between the first charge step and the second charge step in the third embodiment, the pressure application step is carried out. This is different from the third embodiment.

The same steps as those described in the first embodiment designate the same reference signs as those described in the first embodiment and their explanations will be omitted. In addition, the same elements as those for the non-aqueous electrolyte secondary battery in the first embodiment designate like elements described in the first embodiment.

As shown in FIG. 5, the manufacturing method of the secondary battery in the fourth embodiment includes: the seal step of storing electrode laminate 5 in which separators 4 are disposed between positive electrodes 3a and negative electrodes 3b and electrolyte within exterior body 6 constituted by the laminate film and sealing exterior body 6; the first charge step of charging up to a voltage lower than the full charge after the seal step; the pressure application step of applying the pressure on exterior body 6 in which the electrode laminate is stored after the first charge step; a second charge step of charging up to the full charge without unsealing exterior body 6 after the pressure application state; the gas removal step of removing gas generated within exterior body 6 at the second charge step by unsealing exterior body 6, inserting the nozzle through the unsealed port, and absorbing gas to remove gas; and re-seal step of sealing exterior body 6 after the gas removal step.

At the seal step shown in step ST105 in FIG. 5, electrode laminate 5 is stored in exterior body 6, the electrolyte is injected into exterior body, and the opening of exterior body is sealed. Those used in the first embodiment can be utilized as the electrolyte and the solvent.

At the first charge step shown in step ST111, the charge is carried out up to a voltage lower than the full charge, for example, up to about 5% to 50% of the capacity.

In the pressure application step shown in a step ST106 in FIG. 5, in the same way as described in the second embodiment, the flat press working using the flat plate is carried out in a state in which exterior body 6 is sealed. Thus, a large quantity of gas generated within exterior body 6 can be moved from the inside of electrode laminate 5 to the inside of gas accumulating section 5. In the second charge step shown in a step ST112, the charge is carried out up to 100% (full charge) of the capacity.

In the gas removal step shown in step ST107, a part of exterior body 6 is unsealed, the nozzle is inserted through an unsealed port, gas within the inside of exterior body is absorbed via the nozzle and is removed. In the re-seal step shown in a step ST108, unsealed exterior body 6 is sealed.

According to the manufacturing method of the secondary battery in the fourth embodiment, the pressure application step is carried out between the first charge step and the second charge step. A large quantity of gas generated within exterior body 6 at the seal step and at the first charge step can be moved from the inside of electrode laminate 5 to the inside of gas accumulating section 8. Hence, without carrying out the gas removal step with exterior body 6 unsealed before the second charge step, the influence of gas at the second charge step can be reduced. In addition, in the fourth embodiment, the gas removal step is carried out after the second charge step. Hence, due to gas generated within exterior body 6 at the second charge step, an introduction of the reduction of the battery characteristics can be suppressed. Consequently, the number of times of the gas removal steps can be reduced and the influence of gas on the battery characteristics can be suppressed.

In addition, according to the manufacturing method of the secondary battery in the fourth embodiment, gas accumulating section 8 to house gas generated during the use of secondary battery 1 is utilized as gas accumulating section 8 to house gas moved from the inside of electrode laminate 5 during the manufacturing. Hence, such an additional step that gas accumulating section 8 used during the manufacturing is cut from secondary battery 1 is not needed and secondary battery 1 can be manufactured.

Modification Example 4A of Fourth Embodiment

In the pressure application step in the fourth embodiment (step ST106 in FIG. 5), the roll press working using the roll is carried out in a state in which exterior body 6 is sealed in the same way as modification example 2A of the second embodiment described above. Thus, a large quantity of gas generated within exterior body 6 at the first charge step can smoothly be moved from the inside of electrode laminate 5 to the inside of gas accumulating section 8.

In addition, in the pressure application step, when the roll is used to apply the pressure, the roller is moved from one end section of insulating tape 11 pasted on a boundary part between the active material layer and current collecting copper foil constituting the positive electrode or the negative electrode toward a direction of the other end section which is opposite to the one end section. Thus, gas accumulated in the proximity of insulating tape 11 can effectively be moved.

Modification Example 4B of the Fourth Embodiment

In the same way as modification example 2B of the second embodiment, in place of the method of inserting the nozzle through the unsealed port to absorb gas, gas is removed by decreasing the pressure after the unseal of exterior body 6. Thus, gas generated at the second charge step can smoothly be removed to the outside of exterior body 6. In addition, the re-seal step is carried out under the decreased pressure. Thus, gas accumulating section 8 is deflated and the gas accumulating section to accumulate gas generated during the use of the secondary battery can be utilized.

In addition, the seal step in the fourth embodiment is carried out under the decreased pressure. Thus, gas generated when electrode laminate 5 and electrolyte are stored within exterior body 6 can smoothly be removed to the outside of exterior body 6.

In addition, according to necessity, another pressure application step in the same way as the above-described pressure application step may be carried out. By moving gas generated within electrode laminate 5 at the seal step to the inside of gas accumulating section 8, the influence of gas at the first charge step can be reduced.

It should be noted that in the gas removal step under the decreased pressure in each of the preferred embodiments, the pressure decrease may be carried out after exterior body 6 is unsealed and the unseal may be carried out after the pressure decrease.

In addition, the manufacturing method of the secondary battery in each of the preferred embodiments may include another pressure application step which applies the pressure in the lamination direction in a state in which the secondary batteries (cells) is plurally laminated to constitute a module. In this case, the gas accumulating section that the exterior body has functions as a space for gas to be moved from the inside of the electrode laminate when the pressure application is carried out in the state of the module.

It should be noted that the manufacturing method of the secondary battery according to the present invention may, of course, be applied to such a secondary battery that the electrode laminate in which the separators are disposed between the positive electrodes and the negative electrodes is spirally wound.

The invention claimed is:

1. A manufacturing method of a non-aqueous electrolyte secondary battery, comprising:
   a seal step of storing an electrode laminate, in which a separator is disposed between a positive electrode and a negative electrode, and an electrolyte within an exterior body comprising a laminate film and sealing the exterior body;
   a pressure application step of applying pressure on the exterior body in which the electrode laminate is stored;

a charge step of charging up to a full charge;

a gas removal step of removing gas generated within the exterior body at the charge step with the exterior body unsealed; and a re-seal step of sealing the exterior body after the gas removal step, wherein the pressure application step is performed after the seal step and before the re-seal step, and the charge step is performed after the seal step and before the re-seal step.

2. The manufacturing method of the non-aqueous electrolyte secondary battery as claimed in claim 1, wherein the charge step includes:

a first charge step of charging up to a voltage lower than a voltage of the full charge; and a second charge step of charging up to the full charge after the first charge step without unsealing the exterior body, and wherein the first charge step is carried out between the seal step and the pressure application step.

3. The manufacturing method of the non-aqueous electrolyte secondary battery as claimed in claim 1, wherein the charge step includes:

a first charge step of charging up to a voltage lower than a voltage of the full charge; and a second charge step of charging up to the full charge after the first charge step without unsealing the exterior body, and wherein the first charge step is carried out after the pressure application step.

4. The manufacturing method of the non-aqueous electrolyte secondary battery as claimed in claim 2, wherein the exterior body has a space to house gas generated in utilizing the battery, the space provided at a position adjacent to an outer edge section of the electrode laminate, at the seal step, sealing is carried out under a decreased pressure in the exterior body, at the pressure application step, gas generated in the electrode laminate at the first charge step is moved within the space, and at the re-seal step, re-sealing is carried out under the decreased pressure in the exterior body.

5. The manufacturing method of the non-aqueous electrolyte secondary battery as claimed in claim 1, wherein, in the pressure application step, pressure application is carried out using a flat plate.

6. The manufacturing method of the non-aqueous electrolyte secondary battery as claimed in claim 1, wherein, in the pressure application step, pressure application is carried out using a roll.

7. The manufacturing method of the non-aqueous electrolyte secondary battery as claimed in claim 1, wherein the gas removal step is carried out under a decreased pressure in the exterior body.

8. The manufacturing method of the non-aqueous electrolyte secondary battery as claimed in claim 1, wherein the seal step is carried out under a decreased pressure in the exterior body.

9. The manufacturing method of the non-aqueous electrolyte secondary battery as claimed in claim 6, wherein, in the pressure application step, when the roll is used to apply the pressure, a roller is moved from one end section of an insulating tape which is pasted on a boundary section between an active material layer of the positive electrode or the negative electrode and a current collecting foil toward a direction of another end section which is opposite to the one end section.

10. A method of using the non-aqueous electrolyte secondary battery according to claim 1, the method comprising:

powering, by the non-aqueous electrolyte secondary battery, a vehicle in which the non-aqueous electrolyte secondary battery is mounted, wherein the non-aqueous electrolyte secondary battery has a battery capacity of 4 Ah or higher.

11. The manufacturing method of the non-aqueous electrolyte secondary battery as claimed in claim 1, wherein the charge step includes:

a first charge step of charging up to a voltage lower than a voltage of the full charge; and a second charge step of charging up to the full charge after the first charge step without unsealing the exterior body, and wherein the first charge step and the second charge step are carried out after the seal step and after the pressure application step.

12. The manufacturing method of the non-aqueous electrolyte secondary battery as claimed in claim 1, wherein in the pressure application step, a roll is used to apply the pressure, and a roller is moved from one end section of an insulating tape which is pasted on a boundary section between an active material layer of the positive electrode or the negative electrode and a current collecting foil toward a direction of another end section which is opposite to the one end section.

* * * * *